United States Patent
Terao

(10) Patent No.: US 7,596,717 B2
(45) Date of Patent: Sep. 29, 2009

(54) MICROCOMPUTER AND DEBUGGING METHOD

(75) Inventor: Akiko Terao, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 451 days.

(21) Appl. No.: 11/411,149

(22) Filed: Apr. 26, 2006

(65) Prior Publication Data

US 2006/0253743 A1    Nov. 9, 2006

(30) Foreign Application Priority Data

May 6, 2005    (JP)    ............................. 2005-135067

(51) Int. Cl.
  *G06F 11/00* (2006.01)
(52) U.S. Cl. .......................................... 714/25; 714/42
(58) Field of Classification Search ................... 714/25, 714/29, 42, 54, 718, 763
  See application file for complete search history.

(56) References Cited

U.S. PATENT DOCUMENTS

| 6,075,941 A * | 6/2000 | Itoh et al. .................... 717/128 |
| 2005/0268168 A1* | 12/2005 | Ishihara ...................... 714/30 |
| 2006/0206674 A1* | 9/2006 | Chang ........................ 711/154 |

FOREIGN PATENT DOCUMENTS

JP    11-110244    4/1999

* cited by examiner

*Primary Examiner*—Dieu-Minh Le
(74) *Attorney, Agent, or Firm*—McGinn IP Law Group, PLLC

(57) ABSTRACT

A microcomputer includes a first memory area that stores a first program, a second memory area that stores a second program, a CPU that operates in accordance with the first program and the second program, and a debug circuit that controls to block the CPU from accessing the first memory area and prompt the CPU to access the second memory area during debugging of the first program.

7 Claims, 4 Drawing Sheets

MICROCOMPUTER AND DEBUGGING METHOD

BACKGROUND OF THE INVENTION

1. Field of the Invention

The present invention generally relates to a microcomputer and a debugging method and, particularly, to a microcomputer and a debugging method that check the operation as rewriting memory contents.

2. Description of Related Art

A flash memory is more highly impact-resistant compared with a hard disk and therefore suitable for use as a storage device of a microcomputer that is integrated in a vehicle or the like which is subject to external impacts. Recent flash memories have large capacity and are thus capable of storing a large amount of program and data.

In the operational check of the microcomputer having a flash memory which does not include a circuit for storing program or data, the operation is checked after writing program or data into the flash memory by using a dedicated recording device such as a flash writer.

In the implementation of debugging on such a microcomputer, it is inefficient to remove the flash memory from the microcomputer, rewrite the flash memory by using a flash writer, and incorporate the flash memory back to the microcomputer each time modifying the program or data. Further, the repetitive rewriting on the flash memory causes the degradation of durability of the flash memory.

In order to save the labor of replacing the flash memory upon debugging, a technique of incorporating a memory called Temporary RAM (which is abbreviated herein to the "TRAM") for use in the debugging is proposed in Japanese Unexamined Patent Application Publication No. 11-110244, for example. According to this technique, the program or data to be rewritten is written to the TRAM. If the rewriting of program or data is needed during the debugging, a debug circuit rewrites the program or data not in the flash memory but in the TRAM. Then, CPU reads the modified program or data not from the flash memory but from the TRAM. This enables the debugging without replacing the flash memory.

In this configuration, however, the CPU and the TRAM are connected by only one bus. Further, the debug circuit for rewriting the TRAM does not have a function to check the status of the bus. It is thus necessary to prevent simultaneous access from the CPU and the debug circuit to the TRAM.

Therefore, in the debugging method of the related art, the debug circuit transmits a break signal to the CPU and thereby forcibly stops the operation of the CPU prior to rewrite on the TRAM so as to make sure that the CPU does not access the TRAM.

In this method, however, it is necessary to stop the CPU each time rewriting program or data, which causes low operating efficiency. Further, since the CPU is stopped, it is unable to perform the operational check in accordance with the actual operation.

As described in the foregoing, the present invention has recognized that the debugging method of the related art has low operating efficiency and is incapable of performing the operational check in accordance with the actual operation due to the requirement for stopping the CPU each time rewriting program or data.

SUMMARY OF THE INVENTION

According to an aspect of the present invention, there is provided a microcomputer which includes a first memory area that stores a first program, a second memory area that stores a second program, a CPU that operates in accordance with the first program and the second program, and a debug circuit that controls to block the CPU from accessing the first memory area and prompt the CPU to access the second memory area during debugging of the first program.

This configuration enables the debugging without stopping CPU each time rewriting a program.

According to another aspect of the present invention, there is provided a debugging method in a microcomputer including a nonvolatile memory and a CPU, which includes storing a part of a program stored in the nonvolatile memory into a first memory area, storing a part of a program stored in the nonvolatile memory into a second memory area, and blocking the CPU from accessing the first memory area and prompting the CPU to access the second memory area upon debugging of data stored in the first memory area.

This method enables the implementation of debugging without rewriting a flash memory each time performing debugging and without stopping a CPU each time rewriting a program.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

Figure 1:
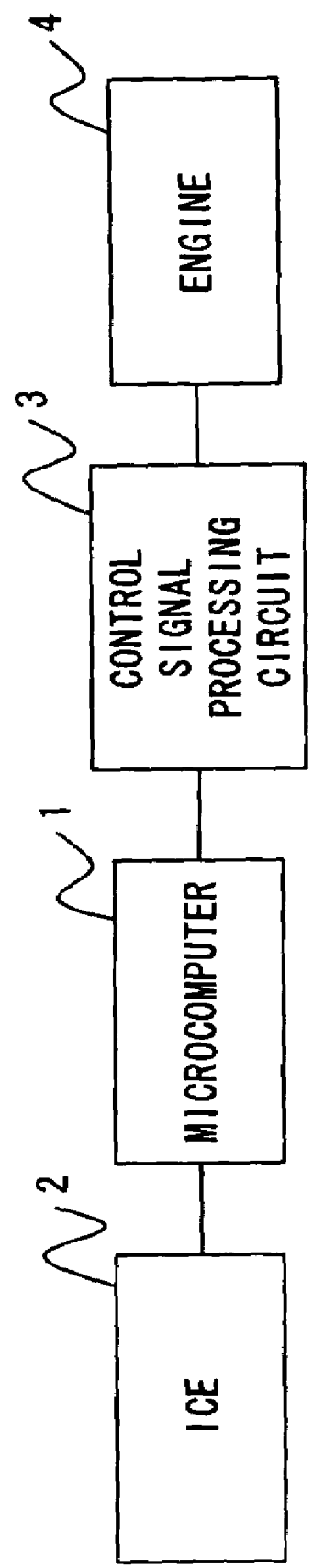
FIG. 1 is a view showing an example of applications of a microcomputer according to an embodiment of the invention.

A microcomputer according to an embodiment of the present invention may be applied for use in the debugging of a microcomputer that is integrated into a vehicle. FIG. 1 is a view showing an example of debugging with the use of the microcomputer according to an embodiment of the present invention.

The microcomputer 1 shown in FIG. 1 controls an engine of a vehicle by supplying a control signal to a control signal processing circuit 3 which is connected thereto. Though the microcomputer 1 is integrated into an engine of a vehicle before shipment, it may be connected outside during debugging as shown in FIG. 1.

The microcomputer 1 is connected to an In-Circuit Emulator (ICE) 2. The ICE 2 is an emulator for implementing debugging on the microcomputer 1. The ICE 2 can monitor the status of a CPU (Central Processing Unit) and a memory inside the microcomputer 1 through a debug circuit placed in the microcomputer 1. Further, the ICE 2 can perform the operational check by changing the value of the memory inside the microcomputer 1. The ICE 2 may be controlled by a PC (not shown) or the like which is connected to the ICE 2.

The microcomputer 1 is also connected to an engine 4 through the control signal processing circuit 3. The control signal processing circuit 3 actually controls the engine 4 according to a control signal supplied from the microcomputer 1. The engine 4 operates under the control of the control signal processing circuit 3 in order to power the vehicle.

Figure 2:
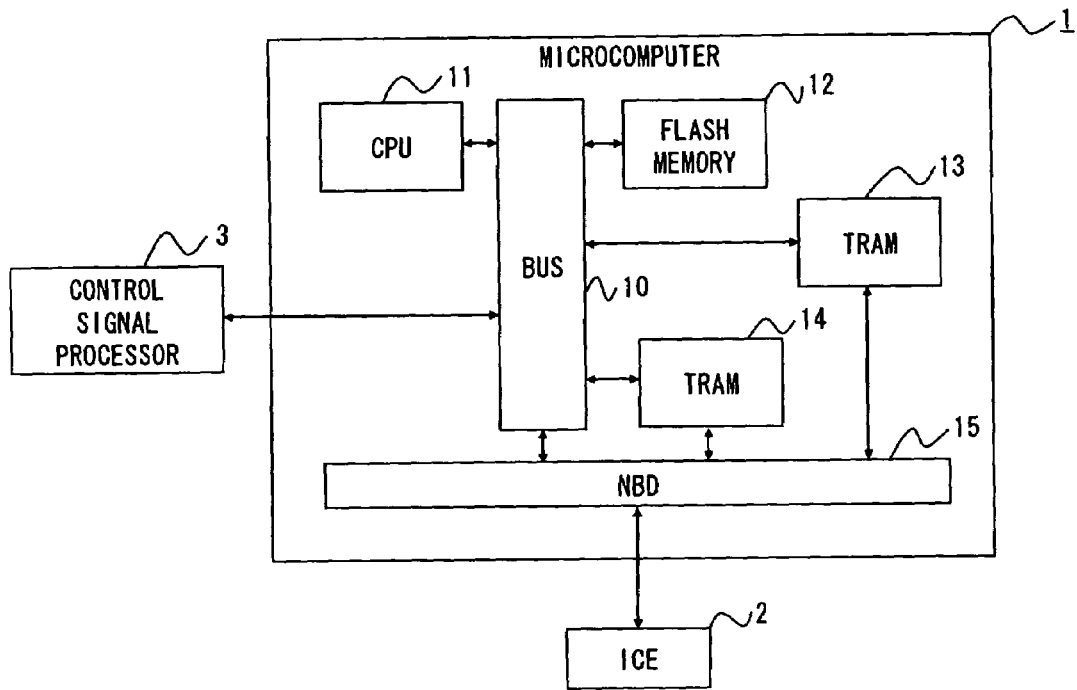
FIG. 2 is a block diagram showing the configuration of a microcomputer according to an embodiment of the invention.

The detailed configuration of the microcomputer 1 according to an embodiment of the present invention is described hereinafter. FIG. 2 is a block diagram showing the configuration of the microcomputer 1 of this embodiment. The microcomputer 1 of this embodiment includes a CPU 11 which an example of a processor, a flash memory 12 which is an electrically rewritable nonvolatile memory, TRAM 13 and TRAM 14 which are RAM macros different from each other, and a Non-Breaking Debug (NBD) 15. The NBD 15 of the microcomputer 1 is connected to the ICE 2.

The CPU 11 is an arithmetical unit for controlling the microcomputer 1. The CPU 11 can be emulated by the ICE 2. The CPU 11 is connected to each of the flash memory 12, TRAM 13 and TRAM 14 through a bus 10. The CPU 11 is capable of reading a program from the flash memory 12, TRAM 13 and TRAM 14. Further, the CPU 11 executes the program read out from the flash memory 12, TRAM 13 and TRAM 14. The CPU 11 receives from the NBD 15 a switch signal for specifying the TRAM to access. In accordance with the input switch signal, the CPU 11 accesses either the TRAM13 or TRAM14. In the following description, the program includes all the data used for the operation of the CPU 11, including commands and numerical data.

The flash memory 12 stores programs that operate on the microcomputer 1. The flash memory 12 is connected to the CPU 11 through the bus 10 so that the CPU 11 reads out the program stored in the flash memory 12.

Figure 3:
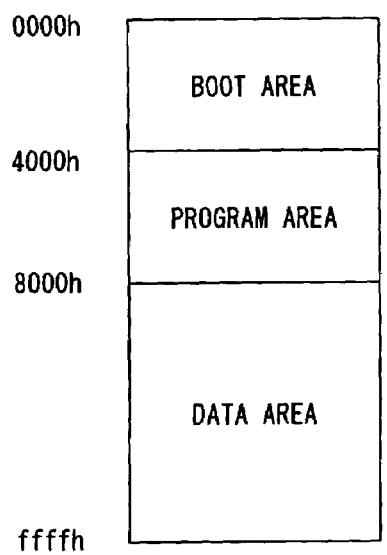
FIG. 3 is a view showing an address map of a flash memory incorporated into a microcomputer according to an embodiment of the invention.

FIG. 3 is a view showing an example of an address space of the flash memory 12. In the example of FIG. 3, the flash memory 12 has a memory size of is 1 MB and addresses of 0000h to ffffh. The memory size, however, is not limited thereto. The area of 0000h to 3fffh is a boot area that stores a boot system program, the area of 4000h to 7fffh is a program area that stores an application program, and the remaining area of 8000h to ffffh is a data area that stores an application data.

The boot area stores the program which is read out first and executed upon activation. The program which is read out at this time is a program for implementing the system control of the microcomputer 1. The program area stores the program which operates on the system. The program which is stored in the program area is a program for outputting a control signal to the control signal processing circuit 3. The data area stores the data which is used by the application program within the program.

The TRAM 13 and TRAM 14 are memory devices which store a part of the program stored in the flash memory 12. The TRAM 13 and TRAM 14 may be RAM that is generally used in microcomputers. The TRAM 13 and TRAM 14 may be formed of the circuits of the same configuration or RAM having difference sizes. Each of the TRAM 13 and TRAM 14 has a memory area.

The TRAM 13 and TRAM 14 are each connected to the CPU 11 through the bus 10. The programs stored in the TRAM 13 and TRAM 14 are read out by the CPU 11. The TRAM 13 and TRAM 14 are also connected to the NBD 15.

The programs stored in the TRAM 13 and TRAM 14 are rewritable by the NBD 15. The data capacity of the TRAM 13 and TRAM 14 may be smaller than that of the flash memory 12. The TRAM 13 and TRAM 14 do not necessarily have the same data capacity.

The NBD 15 is a debug circuit for implementing debugging on the microcomputer 1. The NBD 15 is capable of implementing debugging without stopping any program. The NBD 15 is connected to each of the TRAM 13 and TRAM 14. The NBD 15 can rewrite the programs stored in the TRAM 13 and TRAM 14. The NBD 15 can transmit a switch signal to the CPU 11. Further, the NBD 15 is connected to the ICE 2 and rewrites the TRAM 13 and TRAM 14 in response to the command supplied from the ICE 2.

The ICE 2 is an emulator for implementing debugging on the microcomputer 1. The ICE 2 can read the data in the TRAM 13 and TRAM 14 inside the microcomputer 1 through the NBD 15. The microcomputer 1 is controlled by the ICE 2 in accordance with the operation of a user through a PC or the like which is connected thereto.

Figure 4:
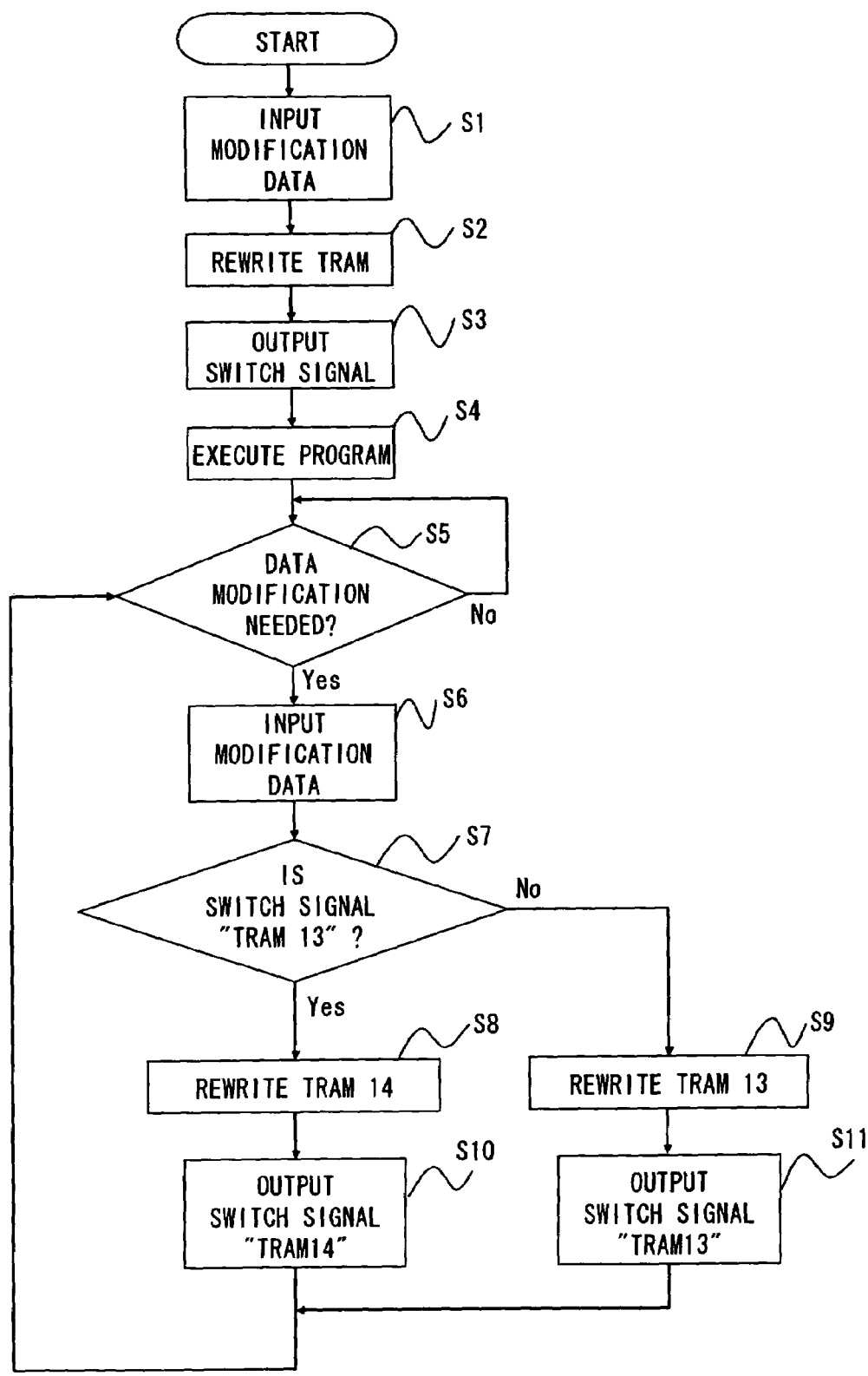
FIG. 4 is a flowchart showing the processing flow of a microcomputer according to an embodiment of the invention.

Referring then to FIG. 4, the processing flow in the debugging on the microcomputer 1 according to this embodiment is described below. FIG. 4 is a flowchart to describe the processing flow in the debugging on the microcomputer 1. In this specification, the debugging includes the processing of correcting program errors, adjusting program data for control and so on.

In the initial condition, the flash memory 12 stores application program and application data. The program stored in the flash memory 12 is written in advance by using a flash writer. If the debugging is already performed, the command for instructing the readout of the application data at a specific address of the application program has been modified.

Figure 5:
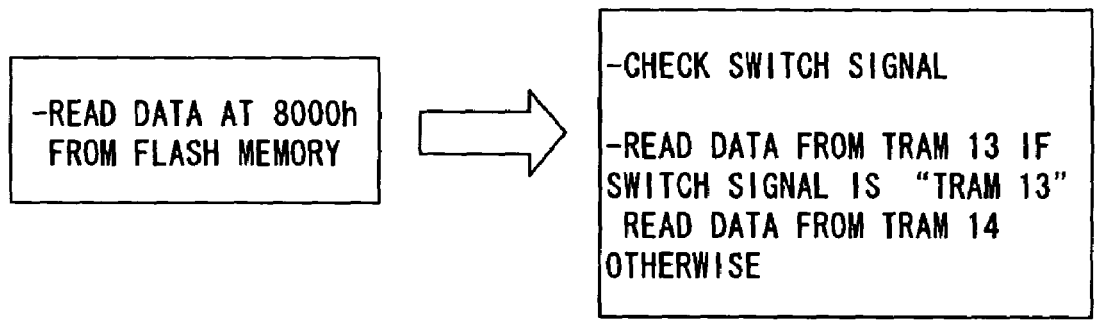
FIG. 5 is a view showing an example of modification of an application program in a microcomputer according to an embodiment of the invention.

FIG. 5 shows an example of modification of the application program. If the rewritten application data is stored in the address of 8000h, the modification is made on the part corresponding to the command of "read out the data at 8000h from the flash memory" in the application program. The command is changed into the command of "check a switch signal and read out the data at a specific address in the TRAM 13 if the switch signal is TRAM 13 and read out the data at a specific address in the TRAM 14 otherwise".

Alternatively, the ICE 2 may monitor the access from the CPU 11 to the flash memory 12 through the NBD 15 and change the access destination of the CPU 11 if the access destination corresponds to the address (8000h) of the data which has been rewritten as above.

In this condition, the ICE 2 can monitor the data stored in the TRAM 13 and TRAM 14 and the control signal supplied to the control signal processing circuit 3 through the debug circuit. A user executes debugging according to the data stored in the TRAM 13 and TRAM 14 or the output control signal.

At the start of the debugging, the user inputs modification data to the ICE 2 (S1). Receiving the modification data, the ICE 2 supplies the input modification data to the NBD 15. After receiving the modification data, the NBD 15 writes the modification data into a given address of the TRAM 13 (S2).

Upon completing the writing of the modification data into the TRAM 13, the NBD 15 outputs the switch signal to the CPU 11 (S3). The switch signal indicates from which of the TRAM 13 and the TRAM 14 the data is to be read out. Though the switch signal is normally bit data such as "0" and "1", the switch signal indicating the readout from the TRAM 13 is referred to as "TRAM 13" and the switch signal indicating the readout from the TRAM 14 is referred to as "TRAM 14" in the following description for purposes of illustration.

In this case, the NBD 15 supplies the switch signal of "TRAM 13" to the CPU 11. Then the CPU 11 starts executing the program stored in the flash memory 12 (S4). The CPU 11 reads the data from the flash memory 12 as necessary. Specifically, when reading the data at the address of the flash memory 12 which corresponds to the data written to the TRAM 13 previously, the CPU 11 refers to the switch signal which is supplied from the NBD 15 and reads the data from the TRAM according to the switch signal. The switch signal output at this time is "TRAM 13", the CPU 11 reads the data from the TRAM 13 when reading the data at the address of the flash memory 12 which corresponds to the data written to the TRAM 13.

After that, the user checks the operational status of the program. If the user determines that there is another need to modify the data (S5), the user inputs modification data to the ICE 2 (S6). Receiving the modification data, the ICE 2 supplies the input modification data to the NBD 15. After receiving the modification data, the NBD 15 determines either the TRAM 13 or the TRAM 14 the data has been written thereto previously (S7) If the switch signal is "TRAM 13", The NBD 15 writes the modification data supplied from the ICE 2 to the TRAM 14 (S8). On the other hand, if the switch signal is "TRAM 14", The NBD 15 writes the modification data supplied from the ICE 2 to the TRAM 13 (S9). Since the switch signal is "TRAM 13" in this case as described above, the NBD 15 writes the modification data supplied from the ICE 2 to a given address of the TRAM 14.

Upon completing the writing of the modification data into the TRAM 14, the NBD 15 supplies the switch signal to the CPU 11 (S10). The switch signal output at this time is "TRAM 14". If the modification data has written into the TRAM 14, the NBD 15 outputs the switch signal of "TRAM 13" (S11). Until the switch signal of "TRAM 14" is input to the CPU 11, the CPU 11 keeps accessing the TRAM 13. This prevents the simultaneous access from the CPU 11 and the NBD 15 to the TRAM 13 or the TRAM 14. This further eliminates the need for breaking the CPU 11.

After receiving the switch signal of "TRAM 14", the CPU 11 reads the data from the TRAM 14 according to the switch signal, when reading the data at the address of the flash memory 12 which corresponds to the data written to the TRAM 14.

After that, the user checks the operational status of the program. If the user determines that there is another need to modify the data (S5), the user inputs modification data to the ICE 2 (S6). Receiving the modification data, the ICE 2 supplies the input modification data to the NBD 15. After receiving the modification data, the NBD 15 determines either the TRAM 13 or the TRAM 14 the data has been written thereto previously (S7). If the switch signal is "TRAM 13", The NBD 15 writes the modification data supplied from the ICE 2 to the TRAM 14 (S8). On the other hand, if the switch signal is "TRAM 14", The NBD 15 writes the modification data supplied from the ICE 2 to the TRAM 13 (S9). Since the switch signal is "TRAM 14" in this case as described above, the NBD 15 writes the modification data supplied from the ICE 2 to a given address of the TRAM 13.

As described in the foregoing, this embodiment switches the memory to write the modification data between the TRAM 13 and the TRAM 14 each time modifying the data, thereby enabling the debugging while preventing the CPU 11 and the NBD 15 from simultaneously accessing the same TRAM without stopping the CPU 11.

Although the TRAM 13 and the TRAM 14 are different memory devices in the above embodiment, it is feasible to use a single memory device and switch between different memory areas in the memory device. In this case, however, access paths from the NBD 15 should be different. It is also feasible to use three or more TRAMS for debugging. Further, the microcomputer 1 is used for the control of the engine 4 in the above embodiment, the present invention may be applied to the debugging on the microcomputer which is used for the control of any other tools than the engine.

It is apparent that the present invention is not limited to the above embodiment and it may be modified and changed without departing from the scope and spirit of the invention.

What is claimed is:

1. A microcomputer, comprising:
    a first memory area that stores a first program;
    a second memory area that stores a second program;
    a CPU that operates in accordance with the first program and the second program; and
    a debug circuit that controls to block the CPU from accessing the first memory area and prompt the CPU to access the second memory area during debugging of the first program,
    wherein the microcomputer is associated with an emulator being associated with the debug circuit, the emulator being configured to implement debugging, and
    wherein, during the debugging, the debug circuit reads data from one of the first memory area and the second memory area through the debug circuit.

2. The microcomputer according to claim 1, wherein the debug circuit blocks one of the first memory area and the second memory area access to the CPU when a respective one of the first memory area and the second memory area contains recently modified program data.

3. A method of debugging a program stored in a first memory portion, the method comprising:
    receiving modification data for the first program;
    writing the received modification data into one of a second memory portion and a third memory portion;
    outputting a switch signal to switch in a central processing unit (CPU) to read from one of a third memory portion and the second memory portion containing the modified data portion;
    executing the first program stored in the first storage unit; and
    referring to the switch signal in executing the first program to determine from which of the second memory or the third memory to read modification data from where program data of the program in the first memory corresponds to the modification data written in the selected memory portion.

4. The method of claim 3, further comprising writing an additional program modification data to the other of the one of the second memory portion and the third memory portion, if additional program modification data is supplied.

5. The method of claim 4, further comprising modifying the switch signal to the opposite memory portion alter the writing of the additional program modification data.

6. The method of claim 3, wherein the first memory portion comprises a flash memory.

7. The method of claim 3, wherein the second memory portion comprises a temporary RAM unit, and
    wherein the third memory portion comprises a temporary RAM unit.

* * * * *